June 21, 1960 W. BILZ 2,942,243
AUTOMATIC RECORDING SYSTEM
Filed Sept. 2, 1955 5 Sheets-Sheet 1

WITNESSES
Edwin E. Bassler
David M. Schiller

INVENTOR
Wilhelm Bilz
BY C. L. Freeman
ATTORNEY

June 21, 1960 W. BILZ 2,942,243
AUTOMATIC RECORDING SYSTEM
Filed Sept. 2, 1955 5 Sheets-Sheet 2

June 21, 1960  W. BILZ  2,942,243
AUTOMATIC RECORDING SYSTEM
Filed Sept. 2, 1955

United States Patent Office 2,942,243
Patented June 21, 1960

2,942,243
AUTOMATIC RECORDING SYSTEM

Wilhelm Bilz, Schwaig, near Nurnberg, Germany, assignor to Siemens-Schuckertwerke Aktiengesellschaft, Erlangen, Germany, a corporation of Germany Filed Sept. 2, 1955, Ser. No. 532,330

Claims priority, application Germany Sept. 4, 1954

21 Claims. (Cl. 340—182)

This invention relates to automatic recording systems and has particular relation to recording systems for recording numerals registered by watthour meters.

In the past, considerable time and money have been expended by utility companies to tabulate charges to be made for electrical energy consumed by customers of such companies. In order to determine the amount of energy consumed, it has been the practice to employ personnel for periodically observing the registrations of watthour meters. Such observations are then referred to additional personnel who must record such observations. These recorded observations must then be translated into monetary charges. These several operations are costly and time consuming. Furthermore, considerable error in the assessed monetary charges may result from the number of operations involved in arriving at such charges.

According to the present invention, a recording system is provided wherein numerals registered by measuring devices such as watthour meters are automatically transferred to recording devices effective to provide a record of such number values. Any suitable recording device may be employed. According to the invention, a system is provided wherein registered numerals are automatically transferred to conventional mechanically-operated calculating machines.

Such machines include a number of manually actuable buttons for performing various functions. A plurality of digit-recording buttons are provided for keying into the machine the component digits of a numeral in their proper sequence. Buttons effective to record "plus" and "minus" notations in association with keyed numerals are also provided. Such machines further include a summation mechanism effective to store keyed numerals in a summed condition with previously stored keyed numerals. A record sheet is ordinarily provided upon which is printed the keyed numerals with the "plus" or "minus" notation in response to actuation of the "plus" or "minus" button. Such actuation is also effective to transfer the keyed numerals to the summation mechanism. A "total" button is also provided effective when actuated to simultaneously print the summed value of the stored numerals and to return the summation mechanism to a zero condition. "Multiplication" buttons may also be included to provide a recorded numeral which is a multiple of a numeral keyed into the machine. In the present invention, electrically operated relays are employed instead of the manually actuable push buttons.

In a preferred embodiment of the invention, a recording system is provided which includes a watthour meter having a plurality of digit-indicating barrels rotatable to register a numeral representative of energy of an associated circuit. A separate contact selector is mounted for movement in accordance with rotation of each barrel to control energization of a plurality of conditioning relays each associated with a separate recording relay. Each contact of each selector represents a separate digit with the contacts of the selectors which represent common digits being connected to a conditioning relay for a digit-recording relay which represents a digit corresponding to the common digits.

Each of the contact selectors is connected for energization from a voltage source through a separate control switch. A master switch is provided to control energization of conditioned ones of the recording relays. Additional control switches control energization of the "plus" and "minus" relays, the "total" relay and the "multiplication" relay for the calculating machine. Preferably, the watthour meter is provided with a "zero" reset device for resetting the digit barrels of the meter to register a zero numeral after a recording period. A control switch may also be provided to control operation of such reset device. In order to control actuation of the several control switches, the recording system includes a switch control device which is operable at the initiation of a recording period to actuate the several control switches in the proper sequence.

If desired, the recording system may include a pair of watthour meters for registering numerals representative of positive and negative directions of energy flow. With this arrangement, each meter is provided with contact selectors having contacts which are connected to the conditioning relays for the recording relays of the calculating machine. Suitable control means are provided for preparing the contact selectors of one or the other meter for energization from the source, and for preparing one or the other of the "plus" and "minus" relays for energization from the source, depending upon the sign of energy which is predominate at the end of a registering period.

According to a further aspect of the invention, a recording system is provided wherein registered numerals are automatically transferred to a teletypewriter device operating according to a predetermined digit system for transmitting such numerals to a remote location. Preferably, a teletypewriter device is utilized which operated according to a five-digit system.

In a preferred embodiment of the invention, the recording system includes a meter with contact selectors having contacts connected to conditioning relays which control energization of five recording relays of the teletypewriter device according to a five-digit system. Each selector is connected for energization from a voltage source through a separate control switch. A switch control device is provided to actuate these control switches, a master switch provided to control energization of conditioned ones of the recording relays, and also other control switches employed to control energization of additional relays of the teletypewriter device including "plus" and "minus" relays.

The invention further provides a recording system wherein a calculating machine as above described may be operated simultaneously with a teletypewriter device. For this purpose, conditioning relays which are common to both recording devices may be employed. In order to record registered numerals represented of positive and negative energy, the system may include two meters each having separate contact selectors with contacts connected to the common conditioning relays for the recording relays of the calculating and teletypewriter devices. Control means are provided for preparing the contact selectors of one or the other meter for energization from the source, and for preparing the "plus" or "minus" relays of the recording devices for energization from the source depending upon the sign of energy which is predominate at the end of a registering period.

It is, therefore, an object of the invention to provide an improved automatic recording system.

It is another object of the invention to provide an improved recording system wherein a numeral registered by a measuring device is automatically transferred to a recording device.

It is a further object of the invention to provide a recording system wherein a numeral which represents a value of energy registered by a watthour meter is automatically transferred to a recording device.

It is still another object of the invention to provide a recording system wherein a numeral which represents a value of energy registered by a watthour meter is automatically transferred to a calculating machine for evaluating such numeral.

It is a still further object of the invention to provide a recording system wherein a numeral which represents a value of energy registered by a watthour meter is automatically transferred to a teletypewriter device operating according to a predetermined digit system for transmitting such numeral to a remote location.

It is another object of the invention to provide a recording system including a recording device and a pair of watthour meters each connected to register a numeral representative of energy flowing in a separate direction with means for automatically transferring the registered numeral which represents energy flowing in the direction predominating during a registering period to the recording device.

It is a further object of the invention to provide a recording system wherein a numeral which represents a value of energy registered by a watthour meter is automatically transferred simultaneously to a calculating machine for evaluating such numeral and a teletypewriter device operating according to a predetermined digit system for transmitting such numeral to a remote location.

It is still another object of the invention to provide a recording system including a calculating machine, a teletypewriter device and a pair of watthour meters each connected to register a numeral representative of energy flowing in a separate direction with means for automatically transferring the registered numeral which represents energy flowing in the direction predominating during a registering period simultaneously to the calculating machine and the teletypewriter device.

Other objects of the invention will become apparent from the following description taken in conjunction with the accompanying drawings, in which.

Figure 1:
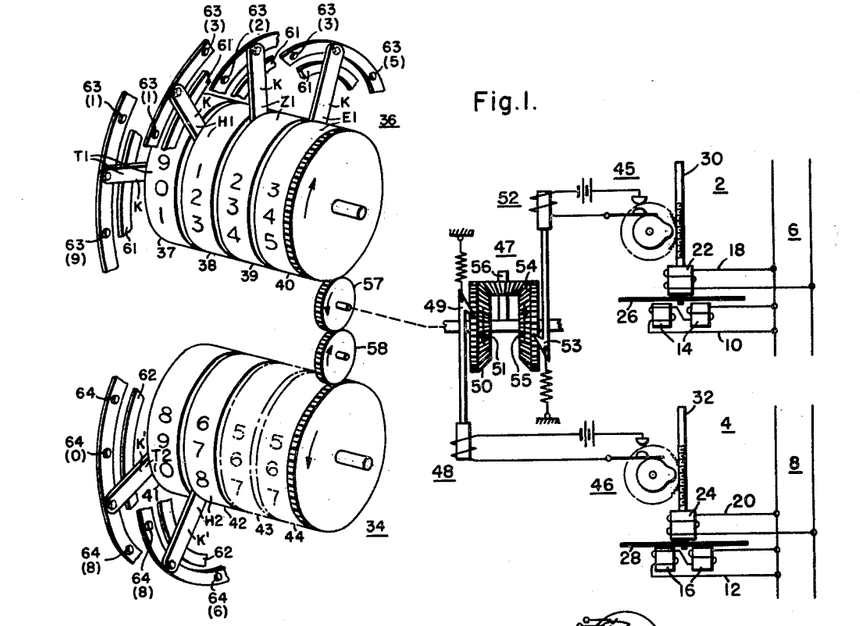
Figure 1 is a diagrammatic view illustrating a pair of watthour meters employed in a recording system constructed in accordance with the invention.

Referring to Fig. 1 there is diagrammatically illustrated a pair of watthour meters represented generally by the numerals 2 and 4 which are associated respectively with alternating current circuits 6 and 8. The meters 2 and 4 may be of conventional construction including respectively current windings 10 and 12 surrounding current magnetic poles 14 and 16. The meters 2 and 4 further include voltage windings 18 and 20 surrounding respectively voltage magnetic poles 22 and 24. The windings 10, 12, 18 and 20 are connected to the circuits 6 and 8 to produce when energized shifting magnetic fields for influencing electroconductive discs 26 and 28 in accordance with energy of the circuits. The discs 26 and 28 are mounted for rotation by means of shafts 30 and 32.

In order to provide a registration of energy of the circuits 6 and 8 the meters 2 and 4 include respectively register devices 34 and 36. The device 36 includes digit barrels 37, 38, 39 and 40 rotatably mounted to represent respectively "thousands," "hundreds," "tens" and "units" of a registered numeral. In a similar manner the device 34 includes rotatably mounted digit barrels 41, 42, 43 and 44 which represent respectively "thousands," "hundreds," "tens" and "units."

In order to unload the meters 2 and 4 they are not directly connected to operate the registering devices 34 and 36, but are connected to impulse generating contactors 45 and 46 which produce impulses at a frequency dependent upon energy of the circuits 6 and 8. The registering devices are then operated by the respective impulses. To simplify the operation separate ones of the meters 2 and 4 are used for the positive and negative directions of energy movement in the circuits 6 and 8. Each meter is provided with an impulse generator and the difference between the positive and negative impulses is produced by a differential mechanism 47. When measuring the electrical energy of several circuits with a separate meter for each circuit, all positive impulses are applied to one part of the differential mechanism 47, and all the negative impulses to another part of the mechanism 47. It is also possible to provide intermediate, summing up gears with contactors and transmission gears corresponding to respective meter constants. Such remote-metering arrangements are well known in the art and need not be explained.

In Fig. 1, the positive impulses are conveyed to an electromagnetic stepping relay 48 which will operate with a jack 49 the first part 50 of the differential mechanism 47 in the direction of the arrow 51. In similar manner, the negative impulses are conveyed to relay 52 which will operate by means of a jack 53 the second part 54 of the differential mechanism 47 in the opposite direction as shown by the arrow 55. The third part 56 of the differential mechanism 47 operates over a toothed gear 57 the device 36 and over the gear 58 the device 34.

The digit-barrels of the devices 34 and 36 are connected respectively to contact selectors K and K' which are moved in accordance with movement of the associated digit-barrels. The selectors K and K' are closed over electroconductive rails 61 and 62 and over the individual contacts 63 and 64 which represent digits as shown associated with such contacts. The switching mechanism or digit-sensing device comprising a digit-barrel and a contact-selector for the device 36 is designated for the "units" with E1 for the "tens" with Z1 for the "hundreds" with H1 and for the "thousands" with T1 in order to facilitate the understanding of the circuits, particularly in Figs. 4, 6 and 8A. In similar manner the corresponding mechanisms of the device 34 are designated with E2, Z2, H2 and T2 as shown in Fig. 1. The digit-barrels 37, 38, 39 and 40 are positioned to register the numerals "0234" whereas the digit-barrels 41, 42, 43 and 44 are positioned to register the numeral "9766."

The register devices 34 and 36 are operated in opposite directions. In order to explain this it shall be assumed that at the beginning of a registering period the devices 34 and 36 register the numeral "0000." When the part 50 of the differential mechanism 47 is moved by one step, the device 36 will show the numeral "0001" and the device 34, operating in an opposite direction through the gears 57 and 58 will show the numeral "9999." This is particularly important for the understanding of Fig. 6.

Figure 2:
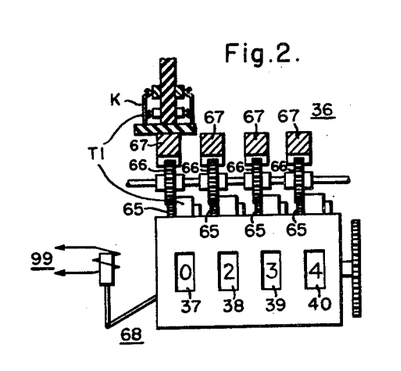
Fig. 2 is a view with parts shown in section of a register and contact-selecting assembly of a meter of Fig. 1.

In Fig. 2, there is shown a different arrangement for the contact selectors. The same parts are designated with the same numerals with only the register device 36 shown. Toothed gears 65 are provided on the digit-barrels 37, 38, 39 and 40, and are in operative relation over intermediate gears 66 with ratchets 67 which support the selectors K. A device 68 is provided for the operation of zero-positioning of the register device in known manner.

Figure 3:
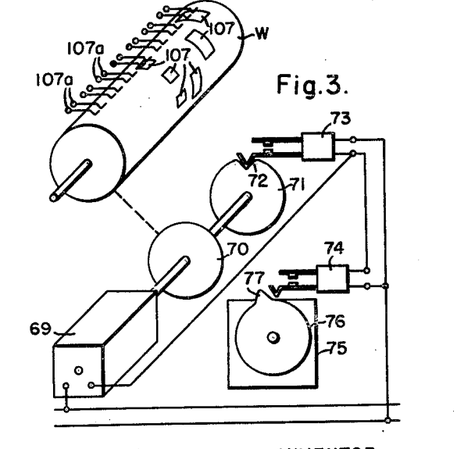
Fig. 3 is a diagrammatic view illustrating a switch control drum and control means therefor employed in a system constructed in accordance with the invention.

Referring to Fig. 3 there is shown apparatus effective to control the recording operation. As there shown an auxiliary motor 69 is provided which drives a gear 70 and a cam disc 71. The gear 70 operates a switching drum W provided to control certain switching operations during the recording period. The cam-disc 71 has a cut-out 72 which controls a switch 73 disposed parallel to a switch 74 which is controlled by a clock 75 over a cam-disc 76 having a cam 77. The operation of this arrangement shall now be described.

At the end of a registering period, for instance, after one hour, the cam 77 closes the switch 74 thus temporarily starting the motor 69 which drives the drum W to initiate a switching cycle and which also drives the disc 71 so that the cut-out 72 operates to close the switch 73. Switch 73 is kept closed by the disc 71 for the period of a switching cycle after switch 74 has been opened. At the end of the switching cycle the cut-out 72 operates to open the switch 73 whereby the motor 69 is cut off.

Figure 4:
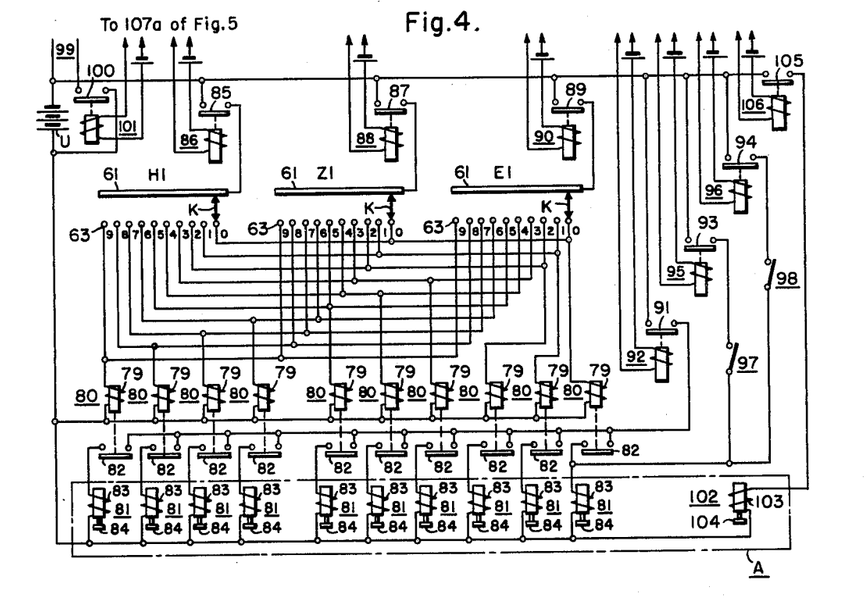
Fig. 4 is a view illustrating a recording system constructed in accordance with the invention.

When dealing with the arrangement shown in Fig. 4 it should be assumed that one of the meters and the associated register device such as the meter 2 and the device 34 shown in Fig. 1 are eliminated and that the stepping relay 48 directly operates the register device 36 without the intermediate differential mechanism 47. The switching mechanism T1 of the device 36 is also eliminated.

Referring now to Fig. 4 the remaining switching mechanisms H1, Z1 and E1 are shown in diagrammatic form. Fig. 4 further shows the selectors K movable over the contact-rails 61 relative to the contacts 63 which represent the digits "0" to "9" as indicated by the associated numerals. The contacts 63 corresponding to the same numerals, for instance "5," are connected to a coil 79 of a conditioning relay 80 for a recording relay 81 of a calculating machine A corresponding to the same numeral. The conditioning relays 80 include switch bars 82 which are movable in response to energization of the coils 79 to control circuits including coils 83 of the recording relays 81 of the machine A. The recording relays 81 include plungers 84 which are movable in response to energization of the coils 83 to perform recording operations in the machine A in a manner similar to the manually actuable buttons ordinarily employed in calculating machines.

The switching mechanism or digit-sensing device H1 is connected for energization from a voltage source U through a switch bar 85 of a relay 86. In a similar manner the mechanism Z1 is connnected to the source U through a switch bar 87 of a relay 88, and the mechanism E1 is connected to the source U through a switch bar 89 of a relay 90. The circuits including the coils 83 of the recording relays 81 are connected to the source U through the switch bars 82 of the conditioning relays 80 and a switch bar 91 of a control relay 92. The recording relay 81 of the calculating machine A corresponding to the digit "0" is connected for energization from the source U through parallel paths including switch bars 93 and 94 of relays 95 and 96 and manually actuable switches 97 and 98. A circuit 99 which includes the zero-positioning device 68 of the register device 36 is connected to the source U through a switch bar 100 of a relay 101.

As previously stated calculating machines include "plus" and "minus" recording buttons actuable to simultaneously print a keyed numeral upon an associated record strip and transfer the keyed numeral to an associated summation mechanism. In Fig. 4 a "plus" recording relay 102 is shown including a coil 103 surrounding a plunger 104 connected to the source U through a switch bar 105 of a relay 106.

Figure 5:
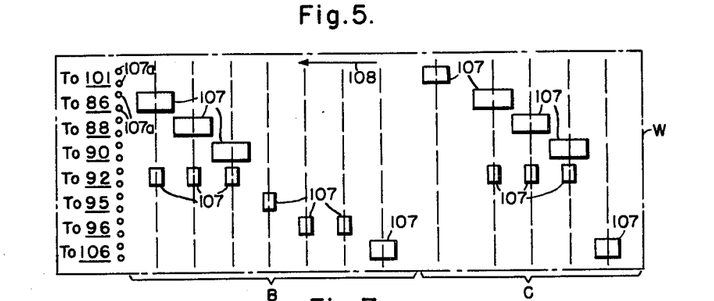
Fig. 5 is a diagrammatic view illustrating a development of a switch control drum employed in the system of Fig. 4.

The several switch bars 85, 87, 89, 91, 93, 94, 100 and 105 are operated by the switching drum W in the sequence shown in the development of the drum W in Fig. 5. The drum W has a first-contact or cam-set B for keying and printing the registered numeral and a second set C for the control-print of the zero-position of the register device 36. As diagrammatically shown the drum W includes a plurality of electroconductive strips 107 spaced and positioned with respect to one another to engage contacts 107a for energizing relays having the reference numerals associated with such contacts. These contacts may be in fixed position to engage the several strips 107 in the proper sequence as the drum W rotates in the direction of the arrow 108 to effect energization of the associated relays.

The operation of the system is as follows: At the beginning of a registering period the contact-selectors and switch bars are in positions as shown in Fig. 4. After the first impulse from the generator 46, the selector K of mechanism E1 moves from the contact 63 representing "0" to the contact 63 representing "1." After each further impulse the selector K moves by one contact to the left until it reaches the contact 63 representing "9." After the following impulse is generated the selector K of the mechanism Z1 moves from "0" to "1" and the selector K of mechanism E1 moves back to "0." This action repeats itself until the selector K of mechanism Z1 reaches the contact "9" and the selector K of mechanism E1 also reaches the corresponding contact "9." After the following impulse the selector K of mechanism H1 is switched over from "0" to "1" and the selectors K of mechanisms Z1 and E1 return to their respective contacts "0."

At the end of the registering period, as mentioned above, the clock-device 75 starts the drum W which performs a switching cycle. First the switch bar 85 of the relay 86 is actuated. If the selector K of mechanism H1 is, for instance, at the position "5," the corresponding conditioning relay 80 is energized to actuate the associated switch bar 82 to thereby condition for energization the recording relay 81 which corresponds to the digit "5." Immediately after this switch bar 91 of relay 92 is actuated. The conditioned recording relay 81 then receives a current-impulse from the source U through the bar 91 and scans the digit "5" for the hundreds position in the calculating machine A. The switch bar 87 of relay 88 is then actuated and immediately after this the switch bar 91 is actuated again. Thus the information on the digit "5" for the "tens" position will be keyed into the machine A. After the switch bar 89 of the relay 90 and the switch bar 91 of the relay 92 are actuated in sequence the digit "5" of the "unit" position will be keyed into the machine A.

If the manual switches 97 and 98 are open as shown in Fig. 4, the switch bars 93 and 94 of the relays 95 and 96 will be temporarily actuated but will have no effect upon the "zero" recording relay 81. After this the switch bar 105 of the relay 106 is actuated which energizes the "plus" relay 102 to print the keyed numeral and to transfer the keyed numeral to the summation mechanism. Finally, the switch bar 100 of the relay 101 is actuated to operate the zero positioning device 68 such that the register device 36 is set in its zero-position. Thus the selectors K of the mechanisms H1, Z1 and E1 will return to their zero positions. By means of the switching drum W the switch bars 85, 87, 89 and 91 are temporarily actuated whereby the information on zero-numerals corresponding to the zero-positions are keyed into the machine A. The switch bar 105 of the relay 106 is also actuated again thus providing the printing of the zero-position. It can be thus controlled that the following registering period will start from the zero position. These zeros can also be keyed into the summation mechanism of the calculating machine A but such transfer is ineffective.

If an appropriate numeral should be multiplied with a coefficient "10," the manual switch 97 is closed. After the respective numeral is keyed into the machine A the switch bar 93 is actuated. Consequently, a further zero is then keyed into the machine A, so that the respective numeral multiplied by "10" is printed. If the numeral should be multiplied by "100," the corresponding manual switch 98 is closed. After the switching drum W has closed twice the switch bar 94 of the relay 96, two zeros are keyed in and a numeral multiplied by "100" is printed. Accordingly a numeral multiplied by "1000" will be obtained when the switches 97 and 98 are closed together.

Figure 6:
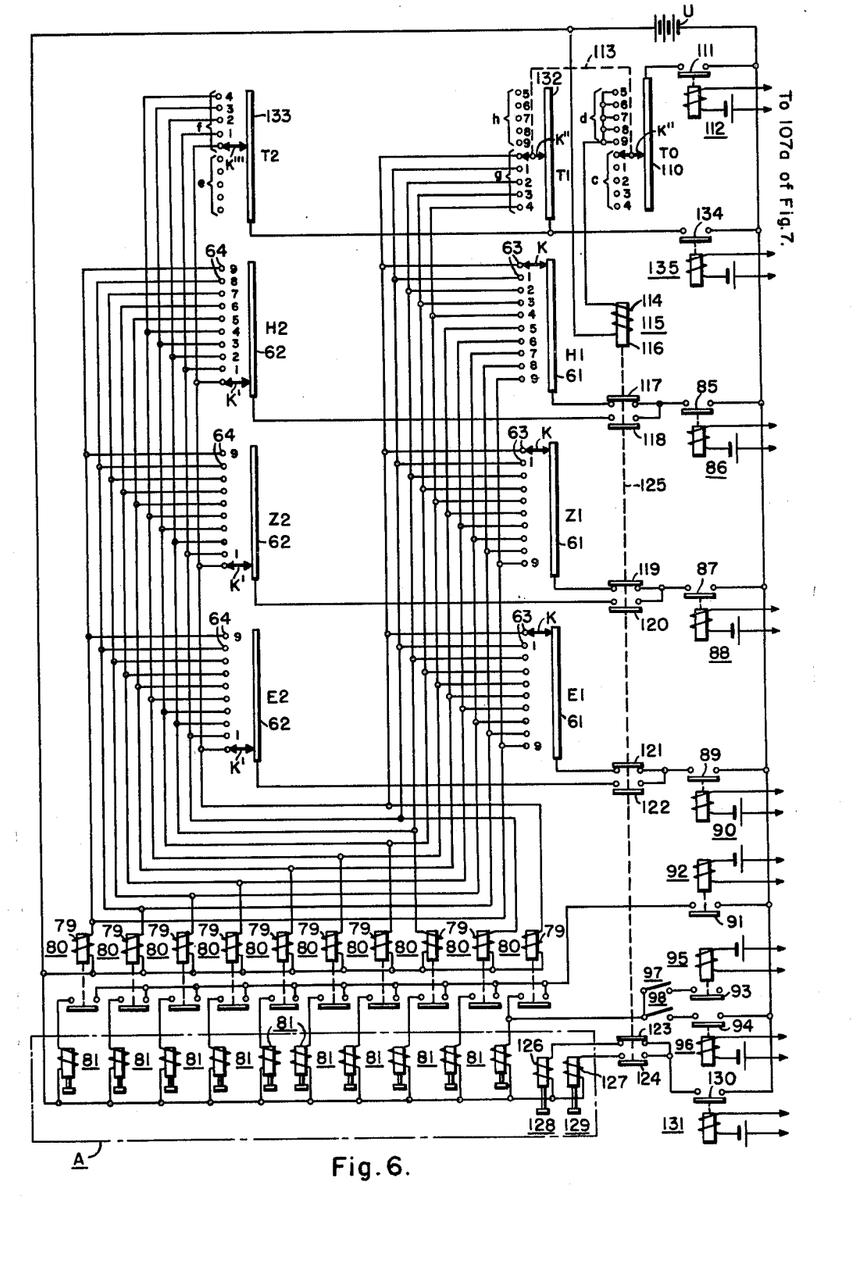
Fig. 6 is a diagrammatic view illustrating a recording system constructed in accordance with a further embodiment of the invention.

The arrangement in Fig. 6 differs from the one in Fig. 4 in that the two meters 2 and 4 and the two stepping relays 48 and 52 are provided for the positive and negative impulses. The same parts are designated with the same reference numerals. In addition to the arrangement shown in Fig. 4 switching mechanisms, T1 and T2 for the "thousands" are provided. A further switching mechanism T0 is connected with the switching mechanism T1, comprising two contact groups $c$ and $d$, a selector K" and a rail 110 which is connected through a switch bar 111 of a relay 112 to a source of voltage U. The selectors K" of mechanisms T0 and T1 are mechanically connected to each other as indicated by the dotted line 113. The contacts $c$ which are associated with contacts representative of digits "0" to "4" of the contact group $g$ of the mechanism T1 are spare contacts. The contacts $d$ which are associated with contacts representative of digits "5" to "9" of the contact group $d$ are connected to a coil 114 of a relay 115 having a plunger 116 to which are connected switch bars 117, 118, 119, 120, 121, 122, 123, and 124 as indicated by the dotted line 125.

Certain of the contacts of the contact-group $g$ of mechanism T1 are connected to the corresponding contacts of mechanisms H1, Z1 and E1. The remaining contacts of the contact group $h$ are spare contacts. Opposite is the case for the mechanism T2 associated with the register device 34 for the negative values. Contacts of the contact group $f$ are connected with the corresponding contacts of mechanisms H2, Z2 and E2 whereas contacts of the contact group $e$ comprise spare contacts. The switch bars 123 and 124 are included respectively in circuits which include coils 126 and 127 of "plus" and "minus" recording relays 128 and 129. These circuits are connected to a common circuit which includes a switch bar 130 of a relay 131. In accordance with the operations of the "plus" or "minus" relays the summation mechanism sums up or subtracts the keyed numerals which are then printed in the calculating machine A with positive or negative signs.

Figure 7:
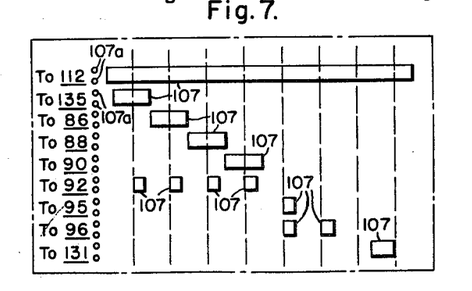
Fig. 7 is a view illustrating a development of a switch control drum employed in the system of Fig. 6.

The switching mechanisms T1 and T2 include rails 132 and 133 which are connected to the source U through a switch bar 134 of a relay 135. The rails 61 and 62 of the mechanisms H1 and H2 are connected to the source U through the switch bars 117 and 118 and the common switch bar 85. In a similar manner the rails 61 and 62 of the mechanisms Z1 and Z2 are connected to the source U through the switch bars 119 and 120 and the common switch bar 87. Also, rails 61 and 62 of mechanisms E1 and E2 are connected to the source U through the switch bars 121 and 122 and the common switch bar 89. The relay 92 with the switch bar 91 controls energization of the conditioned recording relays 81 from the source U in the manner of Fig. 4. Conditioning relays 80 are provided which include coils 79 connected to contacts 63, 64, $f$ and $g$ of the mechanisms H1, Z1, E1, H2, Z2, E2, T2, and T1. It is observed that contacts representing common digits are connected to the coil 79 of the conditioning relay 80 for the recording relay 81 which represents such common digits. The manual switches 97 and 98 and the relays 95 and 96 are also included to control the "zero" recording relay 80 for multiplication purposes. In Fig. 7 there is illustrated a development of the switch control drum W employed in the system of Fig. 6 wherein the zero positions of the register devices 34 and 36 are not printed.

The arrangement operates as follows: the operation is substantially the same as in Figs. 4 and 5 except that in this case the positive and negative impulses of the generators 45 and 46 are considered. The selectors K" and K of the mechanisms T0, T1, H1, Z1, and E1 are moved reversely by each negative impulse. In a similar manner the selectors K" and K' of the mechanisms T2, H2, Z2 and E2 are moved reversely by each positive impulse. In case, at the end of a registering period, the positive impulses overbalance, then the numerals will be keyed into the calculating machine A in a manner similar to Fig. 4 because the switch bars 117, 119, 121 and 123 will be in the position as shown in Figure 6.

The conditions are different in case negative impulses prevail at the beginning of the recording operation. In this case the barrels 41, 42, 43 and 44 of the mechanisms T1, H1, Z1 and E1 rotate from 0000 to 9999 and the contact K" of the mechanism T0 moves from the contact of the group $c$ which represents "0" to the contact of the group $d$ representing "9." Thus the relay 115 will be energized when the relay 112 is energized by the drum W to thereby move the switch bars 118, 120, 122 and 124 into circuit closing positions. Consequently, the mechanisms H2, Z2 and E2 will be energized from the source U when the drum W energizes the relays 86, 88 and 90 so that digits corresponding to the selected contatcs will be keyed into the calculating machine at the end of the registering period. The contact groups $e$ and $h$ are connected in such a manner that for positive values only the contacts of group $g$, and for negative values only the contacts of group $f$ are connected to the calculating machine. But in this case it should be observed that the numeral-value does not exceed the "4000" range. The switch control drum W, according to the development of Fig. 7 operates practically in the same manner as the drum shown in development in Fig. 5. The only difference is that relay 112 is energized at the start of the recording operation and remains closed during the entire switching cycle, so that the abovementioned switch bars 117 through 124 can be placed in the proper position immediately at the start and remain in the respective positions during the keying of the registered numeral. At the end of the switching cycle the relay 131 is energized which, in accordance with the positions of the switch bars 123 and 124, will operate the "plus" recording relay for positive and the "minus" recording relay for negative values.

For remote-metering-systems, particularly for remote metering-adding, specially constructed apparatus and special transmission lines were previously utilized. According to a further aspect of the invention a recording system is provided which includes a teletypewriter for metering telecommunication. It has previously been known to use the teletypewriter for transmittal of numerical values but the respective digits had to first be manually keyed into the teletypewriter, or tapes had to be manually perforated to operate the teletypewriter. Because of the intermediate human operation, mistakes were possible. According to the present invention, the registered numerals are automatically keyed into the teletypewriter without any human interference.

Figure 8A:
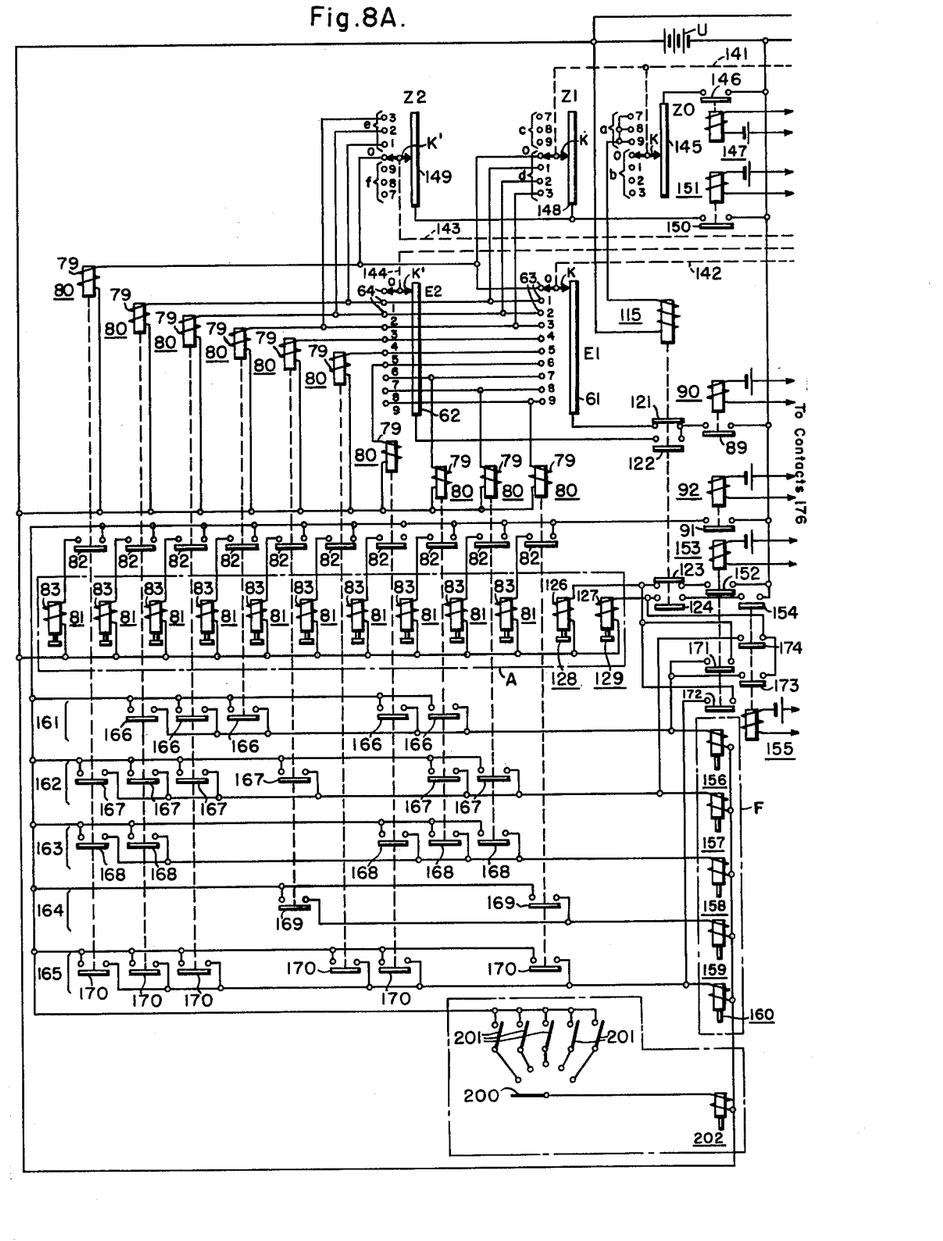
Fig. 8A is a diagrammatic view illustrating a portion of a recording system constructed in accordance with another embodiment of the invention.
Figures 8B, 9:
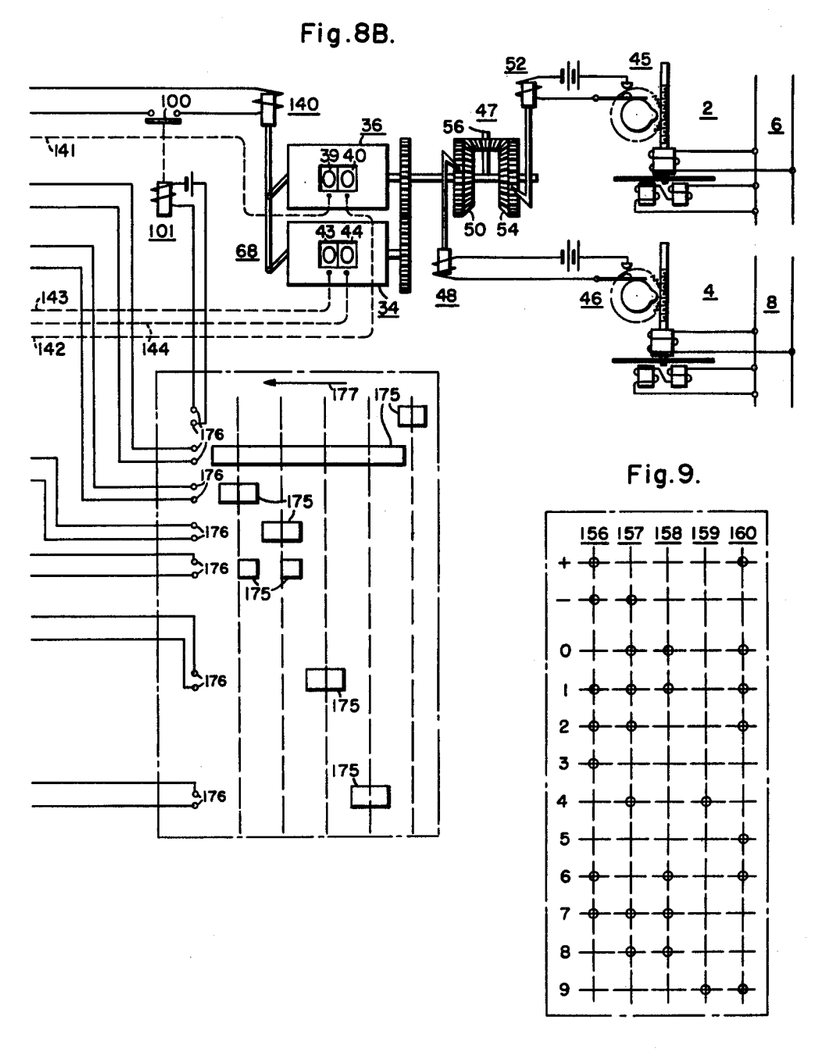
Fig. 8B is a diagrammatic view illustrating the remaining portion of the system of Fig. 8A.
Fig. 9 is a diagrammatic representation illustrating the code for a five-digit system of a conventional telewriter device.

Referring to Figs. 8A, 8B and 9 there is shown a recording system constructed according to a further aspect of the invention. Parts of these figures which are similar to parts of the remaining figures are represented by the same reference numerals. In Fig. 8B two watthour meters 2 and 4 are provided for metering energy passing through circuits 6 and 8. One of the watthour meters measure positive energy and the other watthour meter measures negative energy. The meters are operated by means of impulses through electromagnetic stepping relays 48 and 52. The relays 48 and 52 actuate in opposite sense the parts 50 and 54 of a differential mechanism 47. The third part 56 of the mechanism 47 operates registering devices 34 and 36 of the meters in opposite directions. The devics 34 and 36 are coupled to each other in such a manner that they are at zero-position at the same time.

After the first positive impulse is received by the relay 48 from the generator 46 the device 36 shows the position "01" and the device 34 shows a position "99." In case of the first negative impulse, received by the relay 52 from the generator 45 the device 36 shows the position "99" and the device 34 shows the position "01." To simplify the drawings, each of the devices 34 and 36 is shown with only two digit barrels. In practice they are provided with several barrels so that they can record, for instance, 3 or 4 digits. The device 36 includes the barrels 39 and 40 and the device 34 includes the barrels 43 and 44.

A relay 140 is employed to operate a zero-positioning device 68 for the devices 34 and 36. The relay 140 is energized from a source of voltage U through the switch bar 100 of a relay 101. The movable selector K of the mechanism Z1 is coupled with the "ten" barrel of the device 36 as indicated by the broken line 141. This selector takes along also an additional movable selector K of the mechanism Z0. The "unit" barrel of the device 36 actuates a selector K of the mechanism E1 as indicated by the broken line 142. In a similar manner the "ten" barrel of the device 34 actuates a selector K' of the mechanism Z2 as indicated by the broken line 143. The "unit" barrel of the device 34 actuates a selector K' of the mechanism E2 as indicated by the broken line 144.

The mechanism Z0 includes a rail 145 which is connected to the source U through a switch bar 146 of a relay 147. The mechanisms Z1 and Z2 include respectively rails 148 and 149 which are connected together for energization from the source U through a switch bar 150 of a relay 151. The rails 61 and 62 of the mechanisms E1 and E2 are connected respectively in circuits which include the switch bars 121 and 122 of the relay 115. These circuits are connected to the source U through the common switch bar 89 of the relay 90.

As shown in Fig. 8A the contacts 63 and 64 of the mechanisms E1 and E2 are connected to the coils 79 of the conditioning relays 80. If it is desired to key numerals indicated by the devices 34 and 36 into a calculating machine A, the relays 80 may be provided with switch bars 82 which are included in circuits containing coils 83 of the recording relays 81 of the machine A. The contacts 63 and 64 which represent common digits are connected to a conditioning relay 80 for a recording relay 81 which is representative of a digit corresponding to such common digits.

The contacts of the group *d* of the mechanism Z1 represent digits as indicated by the associated numerals. These contacts are connected to the similarly designated contacts 63 of the mechanism E1. In a similar manner contacts of the group E of mechanism Z2 represent digits as indicated by the associated numerals and are connected to corresponding contacts 64 of the mechanism E2. Contacts of the groups *c*, *f* and *b* of the mechanisms Z1, Z2 and Z0 are spare contacts. Contacts of the group *a* of mechanism Z0 are connected to the relay 115.

The coils 83 of the recording relays 81 of the machine A are connected to the source U through the switch bars 82 of the conditioning relays 80 and also through the switch bar 91 of the relay 92. The machine A may further include "plus" and "minus" relays 128 and 129 having coils 126 and 127 connected respectively to the source U through switch bars 123 and 124 of the relay 115. Energization of the "plus" relay 128 from the source U is further controlled by a switch bar 152 of a relay 153. Also, energization of the "minus" relay 129 is further controlled by a switch bar 154 of a relay 155.

According to the present invention the recording system includes a teletypewriter device F for transmitting numerals keyed therein. Conveniently, the device F is operated simultaneously with the machine A through the conditioning relays 80. Preferably the device F operates according to a five digit system the code for which is illustrated in Fig. 9.

For this purpose the device F includes five recording relays represented by the numerals 156, 157, 158, 159 and 160. According to the code of Fig. 9 a "plus" sign is keyed into the device F when the recording relays 156 and 160 are energized. A "minus" sign will be keyed when the relays 156 and 157 are energized. As a further example the digit "2" is keyed in response to energization of the relays 156, 157 and 160.

In order to control energization of the recording relays of the device F a plurality of switch bar groups 161, 162, 163, 164 and 165 are provided which include respectively pluralities of switch bars 166, 167, 168, 169 and 170. These switch bars are movable with the switch bars 82 of the conditioning relays 80 so as to provide the code illustrated in Fig. 9. For example, the switch bars 166 of the group 161 are associated with relays 80 which correspond to the digits "1," "2," "3," "6" and "7" to control the recording relay 156 of the device F. The recording relays of the device F are connected to the source U through the associated switch bar groups and also through the switch bar 91 of the relay 92.

In order to permit the keying of a "plus" sign into the device F the recording relays 156 and 160 are connected to the source U through switch bars 171 and 172 respectively according to the code of Fig. 9. The switch bars 171 and 172 are movable with the switch bar 152 of the relay 153. Similarly, the relays 156 and 157 are connected to the source U through switch bars 173 and 174 to permit the keying of a "minus" sign into the device F. The switch bars 173 and 174 are movable with the switch bar 154 of the relay 155.

In order to control energization of the relays 101, 147, 151, 90, 92, 153 and 155 a control drum is provided which is similar to the drum W of Fig. 3 but which has a control pattern as shown in the drum development of Fig. 8B. As there shown the control drum may include a plurality of electroconductive strips 175 spaced and positioned in a preselected sequence to engage contacts 176 for energizing the relays represented by numerals associated with the contacts 176 in response to rotation of the drum in the direction of the arrow 177. The control drum may be actuated by means of the arrangement shown in Fig. 3.

The operation of the system is as follows:

At the beginning of the registering period the devices 34 and 36 are in their zero-position and all switch bars and selectors are in positions as shown in Fig. 8A. The positive and negative impulses arrive at 48 and 52. At the end of the registering period the device 36 may have a position at "27" and the device 34 at "73." The selectors of the mechanisms Z1, E1, Z2 and E2 would then assume corresponding positions. With this assumption the selector K of the mechanism Z0 is on the third contact of the group *b* corresponding to the digit "2." The drum W is now actuated. This will first energize the relay 147, but this will cause no action since the relay 115 will not be operated and the associated switch bars 121, 122, 123 and 124 will remain in their shown positions.

Then the relay 151 is energized so that current will flow through the conditioning relay 80 which is connected to the contact 63 of the mechanism Z1 which represents the digit "2." This will cause actuation of the associated switch bars 82, 166, 167 and 170. While the relay 151 is still energized the relay 92 is energized to effect energization of the recording relay 81 corresponding to the digit "2" and the recording relays 156, 157 and 160. Consequently, the digit "2" is keyed into the machine A, and into the device F according to the code of Fig. 9.

The relay 90 is next energized after deenergization of the relays 151 and 92 to cause current flow from the source U through the contact 63 of the mechanism E1 corresponding to the digit "7" and to the relay 80 connected to such contact. This results in actuation of associated switch bars 82, 166, 167 and 168. Shortly thereafter the relay 90 is again energized while the relay 90 is energized to effect energization of the recording relays 81, 156, 157 and 158 so that the digit "7" is keyed into the machine A and the device F.

The relay 153 is next energized after deenergization of the relays 90 and 92 to actuate the associated switch bars 152, 171 and 172. This causes energization of the recording relays 128, 156 and 160 to thereby effect the keying of the "plus" sign into the machine A and the device F. Subsequently, the relay 155 is energized after deenergization of the relay 153 to actuate the switch bars 154, 174 and 173. However, no action results since the switch bar 124 is in a circuit disrupting position. Finally, the relay 101 is energized after deenergization of the relay 155 to operate the zero positioning device 68. It is observed that with the arrangement of Figs. 8A and 8B the keyed numeral cannot exceed the numeral "39."

Other numeral values and the "minus" sign are operated in a similar manner. For negative numeral values the selector K of mechanism Z0 reaches the contact group *a* so that when the relay 147 is energized the relay 115 is placed under current to effect movement of switch bars 121, 122, 123 and 124 to the operating positions other than those illustrated in Fig. 8A. Movement of the switch bars 121 and 122 causes the digits of the device 34 to be keyed in. Movement of the switch bars 123 and 124 cause the recording of the "minus" sign. Hence, the 'minus" sign is fed into the machine A over the switch bars 154 and 124 and into the device F over the switch bars 173 and 174.

Under certain circumstances, it may be advisable not to operate the teletypewriter F and its perforations directly over the relays 156, 157, 158, 159 and 160, but to prepare circuits for a synchronous scanning of a switch 200 by actuation of corresponding switches 201 by such relays. The switch 200 operates synchronously with the actuating mechanism of the teletypewriter F. The execution of the respective switching operation is caused by a relay 202 connected to the switch 200. Such synchronous actuating mechanism is known in the conventional teletypewriter and shall not be described.

Although the invention has been described with reference to certain specific embodiments thereof, numerous modifications thereof are possible. Consequently, the embodiments herein set forth are to be construed in an illustrative rather than in a limiting sense.

I claim as my invention:

1. In a system for automatically recording registrations of a number value representative of a variable measured quantity, a measuring device for measuring said variable quantity, said measuring device including a plurality of digit-indicating members actuable in accordance with said variable quantity to provide a registration of said number value when read in a preselected sequence, a calculating machine for producing during a recording period a record of said registered number value, said calculating machine including a plurality of energizable digit-recording relays each representative of a separate digit within the range of digits indicated by said indicating members, a source of electrical voltage, separate digit-sensing means for each of said indicating members for sensing digits indicated by said indicating members at the initiation of a recording period, each of said sensing means including a plurality of contact means each representative of a separate digit corresponding to digits represented by said recording elements, and contact-selecting means movable in accordance with actuation of the associated indicating member to successively engage the associated contact means; the contact means of said sensing means which represent common digits being connected to control energization of a recording element which is representative of a digit corresponding to said common digits, said contact selecting means being effective to condition the recording relays controlled by selected ones of said contact means for energization from said source, separate actuable switch means connected between said source and each of said contact-selecting means, and actuating means for successively actuating said switch means for permitting energiztion of said conditioned recording relays.

2. In a system for automatically recording registrations of a number value representative of a variable measured quantity, a measuring device for measuring said variable quantity, said measuring device including a plurality of digit-indicating members actuable in accordance with said variable quantity to provide a registration of said number value when read in a preselected sequence, a calculating machine for producing during a recording period a record of said registered number value, said calculating machine including a plurality of energizable digit-recording relays each representative of a separate digit within the range of digits indicated by said indicating members, a source of electrical voltage, a plurality of conditioning relays each energizable from said source to condition a separate one of said recording relays for energization, separate digit-sensing means for each of said indicating members for sensing digits indicated by said indicating members at the initiation of a recording period, each of said sensing means including a plurality of contact means each representative of a separate digit corresponding to digits represented by said recording elements, and contact-selecting means movable in accordance with actuation of the associated indicating member to successively engage the associated contact means; the contact means of said sensing means which represent common digits being connected to a common conditioning relay for a recording relay which is representative of a digit corresponding to said common digits, said contact-selecting means being effective to prepare conditioning relays connected to selected ones of said contact means for energization from said source through said selected contact means, separate actuable first switch means connected between said source and each of said contact-selecting means effective when actuated to energize prepared ones of said conditioning relays through said selected contact means, actuable second switch means connected between said source and said recording relays effective when actuated to energize conditioned ones of said recording relays, and control means for successively actuating each of said first switch means in alteration with said second switch means to effect successive energization of conditioned ones of said recording relays according to said preselected sequence.

3. In a system for automatically recording registrations of a number value representative of a variable measured quantity, a measuring device for measuring said variable quantity, said measuring device including a plurality of digit-indicating members actuable in accordance with said variable quantity to provide a registration of said number value when read in a preselected sequence, a source of voltage, a calculating machine including a plurality of digit-recording relays connected for energization from said source, each recording relay representing a separate digit within the range of digits indicated by said indicating members, said recording relays being effective when energized according to said preselected sequence to record said number value, a plurality of conditioning relays connected for energization from said source independently of said recording relays, each of said conditioning relays being effective when energized to condition a separate one of said recording relays for energization from said source, separate digit-sensing means for each of said indicating members for sensing digits indicated by said indicating members at the initiation of a recording period, each of said sensing means including a plurality of spaced contacts each representative of a separate digit corresponding to digits represented by said recording relays, and contact-selecting means movable in accordance with actuation of the associated indicating member to successively engage the associated contacts; separate sets of contacts which represent common digits being connected to each of said conditioning relays, each of said contact-selecting means being connected between said source and said conditioning relays to control energization of said conditioning relays, said contact-selecting means being effective to prepare for energization from said source conditioning relays which are connected to selected ones of said contacts, separate actuable first switches connected between said source and each of said contact-selecting means, said first switches being effective when actuated to effect energization of prepared ones of said conditioning relays to thereby condition for energization from said source the corresponding recording relays, an actuable second switch connected between said source and said recording relays effective when actuated to energize conditioned ones of said recording relays, motor means, timing means operable after a registering period of predetermined duration to effect energization of said motor means, switch control means actuable by said motor means to effect a switching cycle wherein said first switches and said second switch are successively actuated in alternation to effect successive energization of conditioned ones of said recording relays according to said preselected sequence, and termination means operable in response to completion of a switching cycle for effecting deenergization of said motor means.

4. In a system for automatically recording registrations of a number value representative of a variable measured quantity, a measuring device for measuring said variable quantity, said measuring device including a plurality of digit-indicating members actuable in accordance with said variable quantity to provide a registration of said number value when read in a preselected sequence, a source of voltage, a calculating machine including a plurality of digit-recording relays connected for energization from said source, each recording relay representing a separate digit within the range of digits indicated by said indicating members, said recording relays being effective when energized according to said preselected sequence to record said number value, a plurality of conditioning relays connected for energization from said source independently of said recording relays, each of said conditioning relays being effective when energized to condition a separate one of said recording relays for energization from said source, separate digit-sensing means for each of said indicating members for sensing digits indicated by said indicating members at the initiation of a recording period, each of said sensing means including a plurality of spaced contacts each representative of a separate digit corresponding to digits represented by said recording relays, and contact-selecting means movable in accordance with actuation of the associated indicating member to successively engage the associated contacts; separate sets of contacts which represent common digits being connected to each of said conditioning relays, each of said contact-selecting means being connected between said source and said conditioning relays to control energization of said conditioning relays, said contact-selecting members being effective to prepare for energization from said source conditioning relays which are connected to selected ones of said contacts, separate actuable first switches connected between said source and each of said contact-selecting means, said first switches being effective when actuated to effect energization of prepared ones of said conditioning relays to thereby condition for energization from said source the corresponding recording relays, an actuable second switch connected between said source and said recording relays effective when actuated to energize conditioned ones of said recording relays, circuit means, an electrical motor connected for energization from said circuit means, an actuable starting switch connected between said circuit means and said motor effective when actuated to energize said motor, timing means including first camming means operable after a registering period of predetermined duration to actuate said starting switch for a first preselected camming period, a rotatable control drum for controlling actuation of said first and second switches, said control drum being rotatable in response to energization of said motor to effect a switching cycle wherein said first switches and said second switch are successively actuated in alternation to effect successive energization of conditioned ones of said recording relays according to said preselected sequence, an actuable stopping switch connected between said circuit means and said motor effective when actuated to energize said motor independently of said first motor control switch, and second camming means operable in response to energization of said motor by actuation of said starting switch to actuate said stopping switch for a second preselected camming period, said second camming means being proportioned such that said second camming period is initiated during said first camming period and terminated upon completion of a switching cycle.

5. In a system for automatically recording registrations of a number value representative of a variable measured quantity, a measuring device for measuring said variable quantity, said measuring device including a plurality of digit-indicating members actuable in accordance with said variable quantity to provide a registration of said number value when read in a preselected sequence, a source of voltage, a calculating machine including a plurality of digit-recording relays connected for energization from said source, each recording relay representing a separate digit within the range of digits indicated by said indicating members, said recording relays being effective when energized according to said preselected sequence to record said number value, an actuable summation mechanism effective when actuated to store said recorded number value in a summed condition with number values stored during previous recording periods, recording means actuable to provide a printed record of said recorded number value, and a control relay connected for energization from said source, said control relay being effective when energized to simultaneously actuate said summation mechanism and said recording means; a plurality of conditioning relays connected for energization from said source independently of said recording relays, each of said conditioning relays being effective when energized to condition a separate one of said recording relays for energization from said source, separate digit-sensing means for each of said indicating members for sensing digits indicated by said indicating members at the initiation of a recording period, each of said sensing means including a plurality of spaced contacts each representative of a separate digit corresponding to digits represented by said recording relays, and contact-selecting means movable in accordance with actuation of the associated indicating member to successively engage the associated contacts; separate sets of contacts which represent common digits being connected to each of said conditioning relays, each of said contact-selecting means being connected between said source and said conditioning relays to control energization of said conditioning relays, said contact-selecting means being effective to prepare for energization from said source conditioning relays which are connected to selected ones of said contacts, separate actuable first switches connected between said source and each of said contact-selecting means, said first switches being effective when actuated to effect energization of prepared ones of said conditioning relays to thereby condition for energization from said source the corresponding recording relays, an actuable second switch connected between said source and said recording relays effective when actuated to energize conditioned ones of said recording relays, an actuable third switch connected between said source and said control relay effective when actuated to energize said control relay, and control means for successively actuating said first switches and said second switch in alternation to thereby effect energization of conditioned ones of said recording relays according to said preselected sequence, said control means being effective to actuate said third switch subsequent to actuation of said first switches and said second switch.

6. In a system for automatically recording registrations of a number value representative of a variable measured quantity, a measuring device for measuring said variable quantity, said measuring device including a plurality of digit-indicating members actuable in accordance with said variable quantity to provide a registration of said number value when read in a preselected sequence, a source of voltage, a calculating machine including a plurality of digit-recording relays connected for energization from said source, each recording relay representing a separate digit within the range of digits indicated by said indicating members, said recording relays being effective when energized according to said preselected sequence to record said number value, one of said recording relays being connected for energization from said source independently of the remaining recording relays, a plurality of conditioning relays connected for energization from said source independently of said recording relays, each of said conditioning relays being effective when energized to condition a separate one of said recording relays for energization from said source, separate digit-sensing means for each of said indicating members for sensing digits indicated by said indicating members at the initiation of a recording period, each of said sensing means including a plurality of spaced contacts each representative of a separate digit corresponding to digits represented by said recording relays, and contact-selecting means movable in accordance with actuation of the associated indicating member to successively engage the associated contacts; separate sets of contacts which represent common digits being connected to each of said conditioning relays, each of said contact-selecting means being connetced between said source and said conditioning relays to control energization of said conditioning relays, said contact-selecting means being effective to prepare for energization from said source condition relays which are connected to selected ones of said contacts, separate actuable first switches connected between said source and each of said contact-selecting means, said first switches being effective when actuated to effect energization of prepared ones of said conditioning relays to thereby condition for energization from said source the corresponding recording relays, an actuable second switch connected between said source and said recording relays effective when actuated to energize conditioned ones of said recording relays, a manually actuable switch connected between said source and said one of said recording relays for controlling energization of said one of said recording relays, said manually actuable switch being effective when actuated to condition said one of said recording relays for energization from said source, an actuable third switch connected in series with said manually actuable switch effective when actuated to energize said one of said recording relays when in a conditioned state, and control means for successively actuating said first switches and said second switch in alternation to thereby effect energization of conditioned ones of said recording relays according to said preselected sequence, said control means being effective to actuate said third switch subsequent to actuation of said first and second switches.

7. In a system for automatically recording registrations of a number value representative of a variable measured quantity, a measuring device for measuring said variable quantity, said measuring device including a plurality of digit-indicating members actuable in accordance with said variable quantity to provide a registration of said number value when read in a preselected sequence, said measuring device including reset means operable to actuate said indicating members for resetting said indicating members to indicate "zero" digits, a source of voltage, a calculating machine including a plurality of digit-recording relays connected for energization from said source, each recording relay representing a separate digit within the range of digits indicated by said indicating members, said recording relays being effective when energized according to said preselected sequence to record said number value, a plurality of conditioning relays connected for energization from said source independently of said recording relays, each of said conditioning relays being effective when energized to condition a separate one of said recording relays for energization from said source, a reset relay connected for energization from said source to control operation of said reset means, separate digit-sensing means for each of said indicating members for sensing digits indicated by said indicating members at the initiation of a recording period, each of said sensing means including a plurality of spaced contacts each representative of a separate digit corresponding to digits represented by said recording relays, and contact-selecting means movable in accordance with actuation of the associated indicating member to successively engage the associated contacts; separate sets of contacts which represent common digits being connected to each of said conditioning relays, each of said contact-selecting means being connected between said source and said conditioning relays to control energization of said conditioning relays, said contact-selecting means being effective to prepare for energization from said source conditioning relays which are connected to selected ones of said contacts, separate actuable first switches connected between said source and each of said contact-selecting means, said first switches being effective when actuated to effect energization of prepared ones of said conditioning relays to thereby condition for energization from said source the corresponding recording relays, an actuable second switch connected between said source and said recording relays effective when actuated to energize conditioned ones of said recording relays, an actuable third switch connected between said source and said reset relay effective when actuated to energize said reset relay to operate said reset means, and control means for successively actuating said first switches and said second switch in alternation to thereby effect energization of conditioned ones of said recording relays according to said preselected sequence, said control means being effective to actuate said third switch subsequent to actuation of said first switches and said second switch.

8. In a system for automatically recording registrations of a number value representative of a variable measured quantity, a measuring device for measuring said variable quantity, said measuring device including a plurality of digit-indicating members actuable in accordance with said variable quantity to provide a registration of said number value when read in a preselected sequence, said measuring device including reset means operable to actuate said indicating members for resetting said indicating members to indicate "zero" digits, a source of voltage, a calculating macihne including a plurality of digit-recording relays connected for energization from said source, each of said recording relays representing a separate digit within the range of digits indicated by said indicating members, said recording relays being effective when energized according to said preselected sequence to record said number value, an actuable summation mechanism effective when actuated to store said recorded number value in a summed condition with number values stored during previous recording periods, recording means actuable to provide a printed record of said recorded number value, and a control relay connected for energization from said source, said control relay being effective when energized to simultaneously actuate said summation mechanism and said recording means; a plurality of conditioning relays connected for energization from said source independently of said recording relays, each of said conducting relays being effective when energized to condition a separate one of said recording relays for energization from said source, a reset relay connected for energization from said source to control operation of said reset means, separate digit-sensing means for each of said indicating members for sensing digits indicated by said indicating members at the initiation of a recording period, each of said sensing means including a plurality of spaced contacts each representative of a separate digit corresponding to digits represented by said recording relays, and contact-selecting means movable in accordance with actuation of the associated indicating member to successively engage the associated contacts; separate sets of contacts which represent common digits being connected to each of said conditioning relays, each of said contact-selecting means being connected between said source and said conditioning relays to control energization of said conditioning relays, said contact-selecting means being effective to prepare for energization from said source conditioning relays which are connected to selected ones of said contacts, separate actuable first switches connected between said source and each of said contact-selecting means, said first switches being effective when actuated to effect energization of prepared ones of said conditioning relays to thereby condition for energization from said source the corresponding recording relays, an actuable second switch connected between said source and said recording relays effective when actuated to energize conditioned ones of said recording relays, an actuable third switch connected between said source and said control relay effective when actuated to energize said control relay, an actuable fourth switch connected between said source and said reset relay effective when actuated to energize said reset relay to operate said reset means, and control means effective to actuate said first, second, third and fourth switches in a predetermined sequence such that said first switches and said second switch are initially successively actuated in alternation, said third switch is actuated subsequent to actuation of said first switches and said second switch, said fourth switch is actuated subsequent to actuation of said third switch, and said first switches and second switch are again actuated successively in alternation subsequent to actuation of said fourth switch.

9. In a system for automatically recording registrations of a number value representative of energy of an electrical circuit, a watthour meter for measuring energy of an electrical circuit, said meter including a plurality of digit-indicating members actuable in accordance with energy of said circuit to provide a registration of said number value when read in a preselected sequence, a source of voltage, a translating device including a plurality of digit-recording relays connected for energization from said source, each recording relay representing a separate digit within the range of digits indicated by said indicating members, said recording relays being effective when energized according to said preselected sequence to record said number value, separate digit-sensing means for each of said indicating members for sensing digits indicated by said indicating members at the initiation of a recordng period, each of said sensing means including a plurality of spaced contacts each representative of a separate digit corresponding to digits represented by said recording relays, and contact-selecting means movable in accordance with actuation of the associated indicating member to successively engage the associated contacts; separate sets of contacts which represent common digits being connected to control energization of each of said recording relays, said contact-selecting means being effective to prepare for energization from said source recording relays which are controlled by selected ones of said contacts, separate actuable switches connected between said source and each of said contact-selecting means, and control means for successively actuating said switches according to said preselected sequence.

10. In a system for automatically recording registrations of a number value representative of energy of an electrical circuit, a watthour meter for measuring energy of an electrical circuit, said meter including a plurality of digit-indicating members actuable in accordance with energy of said circuit to provide a registration of said number value when read in a preselected sequence, a source of voltage, a translating device including a plurality of digit-recording relays connected for energization from said source, each recording relay representing a separate digit within the range of digits indicated by said indicating members, said recording relays being effective when energized according to said preselected sequence to record said number value, separate digit-sensing means for each of said indicating members for sensing digits indicated by said indicating members at the initiation of a recording period, each of said sensing means including a plurality of spaced contacts each representative of a separate digit corresponding to digits represented by said recording relays, and contact-selecting means movable in accordance with actuation of the associated indicating member to successively engage the associated contacts; separate sets of contacts which represent common digits being connected to control energization of each of said recording relays, said contact selecting means being effective to prepare for energization from said source conditioning relays which are connected to selected ones of said contacts, separate actuable first switches connected between said source and each of said contact-selecting means, motor means timing means operable after a registering period of predetermined duration to effect energization of said motor means, switch control means actuable by said motor means to effect a switching cycle wherein said switches are successively actuated according to said preselected sequence, and termination means operable in response to completion of a switching cycle for effecting deenergization of said motor means.

11. In a system for automatically recording registrations of a number value representative of energy of an electrical circuit, a watthour meter for measuring energy of an electrical circuit, said meter including a plurality of digit-indicating members actuable in accordance with energy of said circuit to provide a registration of said number value when read in a preselected sequence, a source of voltage, a translating device including a plurality of digit-recording relays connected for energization from said source, each recording relay representing a separate digit within the range of digits indicated by said indicating members, said recording relays being effective when energized according to said preselected sequence to record said number value, an actuable summation mechanism effective when actuated to store said recorded number value in a summed condition with number values stored during previous recording periods, recording means actuable to provide a printed record of said recorded number value, and a control relay connected for energization from said source, said control relay being effective when energized to simultaneously actuate said summation mechanism and said recording means; a plurality of conditioning relays connected for energization from said source independently of said recording relays, each of said conditioning relays being effective when energized to condition a separate one of said recording relays for energization from said source, separate digit-sensing means for each of said indicating members of sensing digits indicated by said indicating members at the initiation of a recording period, each of said sensing means including a plurality of spaced contacts each representative of a separate digit corresponding to digits represented by said recording relays, and contact-selecting means movable in accordance with actuation of the associated indicating member to successively engage the associated contacts; separate sets of contacts which represent common digits being connected to each of said conditioning relays, each of said contact-selecting means being connected between said source and said conditioning relays to control energization of said conditioning relays, said contact-selecting means being effective to prepare for energization from said source conditioning relays which are connected to selected ones of said contacts, separate actuable first switches connected between said source and each of said contact-selecting means, said first switches being effective when actuated to effect energization of prepared ones of said conditioning relays to thereby condition for energization from said source the corresponding recording relays, an actuable second switch connected between said source and said recording relays effective when actuated to energize conditioned ones of said recording relays, an actuable third switch connected between said source and said control relay effective when actuated to energize said control relay, and control means for successively actuating said first switches and said second switch in alternation to thereby effect energization of conditioned ones of said recording relays according to said preselected sequence, said control means being effective to actuate said third switch subsequent to actuation of said first switches and said second switch.

12. In a system for automatically recording registrations of a number value representative of energy of an electrical circuit, a watthour meter for measuring energy of an electrical circuit, said meter including a plurality of digit-indicating members actuable in accordance with energy of said circuit to provide a registration of said number value when read in a preselected sequence, a source of voltage, a translating device including a plurality of digit-recording relays connected for energization from said source, each recording relay representing a separate digit within the range of digits indicated by said indicating members, said recording relays being effective when energized according to said preselected sequence to record said number value, one of said recording relays being connected for energization from said source independently of the remaining recording relays, a plurality of conditioning relays connected for energization from said source independently of said recording relays, each of said conditioning relays being effective when energized to condition a separate one of said recording relays for energization from said source, separate digit-sensing means for each of said indicating members for sensing digits indicated by said indicating members at the initiation of a recording period, each of said sensing means including a plurality of spaced contacts each representative of a separate digit corresponding to digits represented by said recording relays, and contact-selecting means movable in accordance with actuation of the associated indicating member to successively engage the associated contacts; separate sets of contacts which represent common digits being connected to each of said conditioning relays, each of said contact-selecting means being connected between said source and said conditioning relays to control energization of said conditioning relays, said contact-selecting means being effective to prepare for energization from said source conditioning relays which are connected to selected ones of said contacts, separate actuable first switches connected between said source and each of said contact-selecting means, said first switches being effective when actuated to effect energization of prepared ones of said conditioning relays to thereby condition for energization from said source the corresponding recording relays, an actuable second switch connected between said source and said recording relays effective when actuated to energize conditioned ones of said recording relays, a manually actuable switch connected between said source and said one of said recording relays for controlling energization of said one of said recording relays, said manually actuable switch being effective when actuated to condition said one of said recording relays for energization from said source, an actuable third switch connected in series with said manually actuable switch effective when actuated to energize said one of said recording relays when in a conditioned state, and control means for successively actuating said first switches and said second switch in alternation to thereby effect energization of conditioned ones of said recording relays according to said preselected sequence, said control means being effective to actuate said third switch subsequent to actuation of said first and second switches.

13. In a system for automatically recording registrations of a number value representative of energy of an electrical circuit, a watthour meter for measuring energy of an electrical circuit, said meter including a plurality of digit-indicating members actuable in accordance with energy of said circuit to provide a registration of said number value when read in a preselected sequence, said measuring device including reset means operable to actuate said indicating members for resetting said indicating members to indicate "zero" digits, a source of voltage, a translating device including a plurality of digit-recording relays connected for energization from said source, each recording relay representing a separate digit within the range of digits indicated by said indicating members, said recording relays being effective when energized according to said preselected sequence to record said number value, an actuable summation mechanism effective when actuated to store said recorded number value in a summed condition with number values stored during previous recording periods, recording means actuable to provide a printed record of said recorded number value, and a control relay connected for energization from said source, said control relay being effective when energized to simultaneously actuate said summation mechanism and said recording means; a plurality of conditioning relays connected for energization from said source independently of said recording relays, each of said conditioning relays being effective when energized to condition a separate one of said recording relays for energization from said source, a reset relay connected for energization from said source to control operation of said reset means, separate digit-sensing means for each of said indicating members for sensing digits indicated by said indicating members at the initiation of a recording period, each of said sensing means including a plurality of spaced contacts each representative of a separate digit corresponding to digits represented by said recording relays, and contact-selecting means movable in accordance with actuation of the associated indicating member to successively engage the associated contacts; separate sets of contacts which represent common digits being connected to each of said conditioning relays, each of said contact-selecting means being connected between said source and said conditioning relays to control energization of said conditioning relays, said contact-selecting means being effective to prepare for energization from said source conditioning relays which are connected to selected ones of said contacts, separate actuable first switches connected between said source and each of said contact-selecting means, said first switches being effective when actuated to effect energization of prepared ones of said conditioning relays to thereby condition for energization from said source the corresponding recording relays, an actuable second switch connected between said source and said recording relays effective when actuated to energize conditioned ones of said recording relays, an actuable third switch connected between said source and said control relay effective when actuated to energize said control relay, an actuable fourth switch connected between said source and said reset relay effective when actuated to energize said reset relay to operate said reset means, and control means effective to actuate said first, second, third and fourth switches in a predetermined sequence such that said first switches and said second switch are initially successively actuated in alternation, said third switch is actuated subsequent to actuation of said first switches and said second switch, said fourth switch is actuated subsequent to actuation of said third switch, and said first switches and second switch are again actuated successively in alternation subsequent to actuation of said fourth switch.

14. In a system for automatically recording registrations of a number value representative of energy of an electrical circuit, a watthour meter for measuring energy of an electrical circuit, said meter including a plurality of digit-indicating barrels rotatable about a common axis relative to one another, a rotor structure rotatable about an axis in accordance with energy of said circuit, electrical impulse generating means coupled to said rotor structure to produce electrical impulses of frequency dependent upon the rate of rotation of said rotor structure, gearing means mounted for rotation to effect rotation of said indicating barrels, and relay means energizable by said electrical pulses to effect predetermined rotation of said gearing means for each pulse to thereby effect rotation of said indicating barrels in accordance with energy of said circuit, said indicating barrels providing a registration of said number value when read in a preselected sequence; a source of voltage, a translating device including a plurality of digit-recording relays connected for energization from said source, each representing a separate digit within the range of digits indicated by said indicating barrels, said recording relays being effective when energized according to said preselected sequence to record said number value, a plurality of conditioning relays connected for energization from said source independently of said recording relays, each of said conditioning relays being effective when energized to condition a separate one of said recording relays for energization from said source, separate digit-sensing means for each of said indicating barrels for sensing digits indicated by said indicating barrels at the initiation of a recording period, each of said sensing means including a plurality of spaced contacts each representative of a separate digit corresponding to digits represented by said recording relays, and contact-selecting means movable in accordance with actuation of the associated indicating barrel to successively engage the associated contacts; separate sets of contacts which represent common digits being connected to each of said conditioning relays, each of said contact-selecting means being connected between said source and said conditioning relays to control energization of said conditioning relays, said contact-selecting means being effective to prepare for energization from said source conditioning relays which are connected to selected ones of said contacts, separate actuable first switches connected between said source and each of said contact-selecting means, said first switches being effective when actuated to effect energization of prepared ones of said conditioning relays to thereby condition for energization from said source the corresponding recording relays, an actuable second switch connected between said source and said recording relays effective when actuated to energize conditioned ones of said recording relays, and control means for successively actuating said first switches and said second switch in alternation to thereby effect energization of conditioned ones of said recording relays according to said preselected sequence.

15. In a system for automatically recording a registered number value representative of the differential between positive and negative energy of electrical circuit means, a first watthour meter including a plurality of positive digit-indicating members actuable in accordance with the differential between positive and negative energy to register a number value representing positive energy when positive energy predominates in said circuit means, a second watthour meter including a plurality of negative digit-indicating members actuable in accordance with the differential between positive and negative energy to register a number value representing negative energy when negative energy predominates in said circuit means, a translating device including a plurality of energizable digit-recording relays effective when energized in a preselected sequence to record one of said registered number values, each of said recording relays representing a separate digit within the range of digits indicated by said indicating members, separate positive digit-sensing devices for each of said positive indicating members energizable during a recording period to produce a separate energizing quantity for each digit then indicated by said positive indicating members, separate negative digit-sensing devices for each of said negative indicating members energizable during a recording period to produce a separate energizing quantity for each digit then indicated by said negative indicating members, said positive and negative sensing devices being connected such that energizing quantities for common digits control energization of a common recording relay representing a digit corresponding to said common digits, energizable relay means having a pair of operating conditions each effective to prepare for energization a separate one of said positive and negative sensing devices, control means arranged to establish an operating condition during a recording period effective for preparing the sensing devices for the indicating members then registering a number value representing energy having a sign predominant in said circuit means, separate switches actuable to effect energization of each of the prepared sensing devices, and switch control means for successively actuating said switches in a predetermined order during said recording period to effect the successive production of energizing quantities permitting energization of corresponding recording relays according to said preselected sequence.

16. In a system for automatically recording a registered number value representative of the differential between positive and negative energy of electrical circuit means, a first watthour meter including a plurality of positive digit-indicating members actuable in accordance with the differential between positive and negative energy to register a number value representing positive energy when positve energy predominates in said circuit means, a second watthour meter including a plurality of negative digit-indicating members actuable in accordance with the differential between positive and negative energy to register a number value representing negative energy when negative energy predominates in said circuit means, a translating device including a plurality of energizable digit-recording relays effective when energized in a preselected sequence to record one of said registered number values, each of said recording relays representing a separate digit within the range of digits indicated by said indicating members, an energizable positive sign-recording relay effective when energized to record a positive sign with said recorded number value, and an energizable negative-sign-recording relay effective when energized to record a negative sign with said recorded number value; separate positive digit-sensing devices for each of said positive indicating members energizable during a recording period to produce a separate energizing quantity for each digit then indicated by said positive indicating members, separate negative digit-sensing devices for each of said negative indicating members energizable during a recording period to produce a separate energizing quantity for each digit then indicated by said negative indicating members, said positive and negative sensing devices being connected such that energizing quantities for common digits control energization of a common digit-recording relay representing a digit corresponding to said common digits, energizable relay means having a pair of operating conditions each effective to prepare for energization a separate one of said positive and negative sensing devices and a separate one of said sign-recording relays, control means arranged to establish an operating condition during a recording period effective for preparing the sensing devices for the indicating members when registering a number value representing energy having a sign predominant in said circuit means, and effective for preparing the sign-recording relay representing said predominant sign, separate first switches actuable to effect energization of each of the prepared sensing devices, a second switch actuable to effect energization of the prepared sign-recording relay, and switch control means for successively actuating said switches in a predetermined order during said recording period to effect the successive production of energizing quantities permitting energization of corresponding recording relays according to said preselected sequence, said switch control means being effective to actuate said second switch subsequent to actuation of said first switches.

17. In a system for automatically recording a registered number value representative of the differential between positive and negative energy of electrical circuit means, a first watthour meter including a plurality of positive digit-indicating members actuable in accordance with the differential between positive and negative energy to register a number value representing positive energy when positive energy predominates in said circuit means, a second watthour meter including a plurality of negative digit-indicating members actuable in accordance with the differential between positive and negative energy to register a number value representing negative energy when negative energy predominates in said circuit means, a translating device including a plurality of energizable digit-recording relays effective when energized in a preselected sequence to record one of said registered number values, each of said recording relays representing a separate digit within the range of digits indicated by said indicating members, a plurality of energizable conditioning relays each effective when energized to condition a separate one of said recording relays for energization, separate positive digit-sensing devices for each of said positive indicating members energizable during a recording period to produce a separate energizing quantity for each digit then indicated by said positive indicating members, separate negative digit-sensing devices for each of said negative indicating members energizable during a recording period to produce a separate energizing quantity for each digit then indicated by said negative indicating members, said positive and negative sensing devices being connected to said conditioning relays such that energizing quantities for common digits effect energization of a common conditioning relay for a recording relay which represents a digit corresponding to said common digits, energizable relay means having a pair of operating conditions each effective to prepare for energization a separate one of said positive and negative sensing devices, control means arranged to establish an operating condition during a recording period effective for preparing the sensing devices for the indicating members then registering a number value representing energy having a sign predominant in said circuit means, separate first switches actuable to effect energization of each of the prepared sensing devices, a second switch actuable to effect energization of each of the conditioned recording relays, and switch control means for successively actuating said first switches for a predetermined time during a recording period to effect successive energization of said prepared sensing devices for conditioning the corresponding recording relays, and for actuating said second switch successively at times during which said first switches are actuated to thereby effect energization of said conditioned recording relays according to said preselected sequence.

18. In a system for automatically recording a registered number value representative of the differential between positive and negative energy of electrical circuit means, a first watthour meter including a plurality of positive digit-indicating members actuable in accordance with the differential between positive and negative energy to register a number value representing positive energy when positive energy predominates in said circuit means, a second watthour meter including a plurality of negative digit-indicating members actuable in accordance with the differential between positive and negative energy to register a number value representing negative energy when negative energy predominates in said circuit means, a translating device including a plurality of energizable digit-recording relays effective when energized in a preselected sequence to record one of said registered number values, each of said recording relays representing a separate digit within the range of digits indicated by said indicating members, an energizable positive sign-recording relay effective when energized to record a positive sign with said recorded number value, and an energizable negative-sign-recording relay effective when energized to record a negative sign with said recorded number value; a plurality of energizable conditioning relays each effective when energized to condition a separate one of said recording relays for energization, separate positive digit-sensing devices for each of said positive indicating members energizable during a recording period to produce a separate energizing quantity for each digit then indicated by said positive indicating members, separate negative digit-sensing devices for each of said negative indicating members energizable during a recording period to produce a separate energizing quantity for each digit then indicated by said negative indicating members, said positive and negative sensing devices being connected to said conditioning relays such that energizing quantities for common digits effect energization of a common conditioning relay for a recording relay which represents a digit corresponding to said common digits, energizable relay means having a pair of operating conditions each effective to prepare for energization a separate one of said positive and negative sensing devices, and a separate one of said sign-recording relays, control means arranged to establish an operating condition during a recording period effective for preparing the sensing devices for the indicating members then registering a number value representing energy having a sign predominant in said circuit means, and effective for preparing the sign-recording relay representing said predominant sign, separate first switches actuable to effect energization of each of the prepared sensing devices, a second control switch actuable to effect energization of each of the condition recording relays, a third switch actuable to effect energization of the prepared sign-recording relay, and switch control means for successively actuating said first switches for a predetermined time during a recording period to effect successive energization of said prepared sensing devices for conditioning the corresponding recording relays, and for actuating said second switch successively at times during which said first switches are actuated to thereby effect energization of said conditioned recording relays according to said preselected sequence, said switch control means being effective to actuate said third switch subsequent to actuation of said first and second switches.

19. In an automatic recording system, a watthour meter having a register including a plurality of actuable digit-indicating members, a separate plurality of contacts associated with each of said members, each contact of a plurality of contacts representing a separate digit indicated by the associated member, a separate contact selector movable in accordance with actuation of each of said members to successively engage the associated contacts, said selectors being arranged to engage contacts representing digits indicated by said members at a given time, a source of voltage, an actuable first switch connected between said source and each of said selectors, a plurality of conditioning relays connected to said contacts for energization from said source through said first switch and through selected ones of said contacts, a teletypewriter device including a plurality of recording relays operable according to a predetermined digit system, an actuable second switch connected between said source and said recording relays, said recording relays being conditioned for energization from said source through said second switch according to said digit system in response to energization of selected ones of said conditioning relays, and a switch control device effective to initially actuate said first switch to energize selected ones of said conditioning relays and to actuate said second switch during actuation of said first switch to effect energization of conditioned ones of said recording relays.

20. In an automatic recording system, a watthour meter having a register including a plurality of actuable digit-indicating members, a separate plurality of contacts associated with each of said members, each contact of a plurality of contacts representing a separate digit indicated by the associated member, a separate contact selector movable in accordance with actuation of each of said members to successively engage the associated contacts, said selectors being arranged to engage contacts representing digits indicated by said members at a given time, a source of voltage, an actuable first switch connected between said source and each of said selectors, a plurality of conditioning relays connected to said contacts for energization from said source through said first switch and through selected ones of said contacts, a teletypewriter device including five recording relays operable according to a five digit system, an actuable second switch connected between said source and said recording relays, said recording relays being conditioned for energization from said source through said second switch according to said digit system in response to energization of selected ones of said conditioning relays, and a switch control device effective to initially actuate said first switch to energize selected ones of said conditioning relays, and to actuate said second switch during actuation of said first switch to effect energization of conditioned ones of said recording relays.

21. In an automatic recording system, a watthour meter having a register including a plurality of actuable digit-indicating members, a separate plurality of contacts associated with each of said members, each contact of a plurality of contacts representing a separate digit indicated by the associated member, a separate contact selector movable in accordance with actuation of each of said members to successively engage the associated contacts, said selectors being arranged to engage contacts representing digits indicated by said members at a given time, a source of voltage, an actuable first switch connected between said source and each of said selectors, a plurality of conditioning relays connected to said contacts for energization from said source through said first switch and through selected ones of said contacts, a teletypewriter device including a plurality of first recording relays operable according to a predetermined digit system, a calculating machine including a plurality of second recording relays each representative of a separate digit corresponding to digits represented by said contacts, an actuable second switch connected between said source and said first and second recording relays, said first and second recording relays being conditioned for energization from said source through said second switch in response to energization of selected ones of said conditioning relays, and a switch control device effective to initially actuate said first switch to energize selected ones of said conditioning relays, and to actuate said second switch during actuation of said first switch to effect energization of conditioned ones of said recording relays.

References Cited in the file of this patent

UNITED STATES PATENTS

| | | |
|---|---|---|
| 1,244,634 | Neff | Oct. 30, 1919 |
| 2,098,227 | Chauveau | Nov. 9, 1937 |
| 2,295,533 | Leathers | Sept. 15, 1942 |
| 2,314,720 | Leathers | Mar. 23, 1943 |
| 2,325,409 | Leathers | July 27, 1943 |
| 2,444,106 | Miles | June 29, 1948 |